United States Patent
Swart et al.

(10) Patent No.: US 8,465,254 B2
(45) Date of Patent: Jun. 18, 2013

(54) STEAM TURBINE HALF SHELL JOINT ASSEMBLY

(75) Inventors: Thomas William Swart, Niskayuna, NY (US); Jeyaruban Selliah Amirtharajah, Niskayuna, NY (US); Michael Thomas Hamlin, Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 750 days.

(21) Appl. No.: 12/749,826

(22) Filed: Mar. 30, 2010

(65) Prior Publication Data

US 2011/0243727 A1 Oct. 6, 2011

(51) Int. Cl.
*F01D 25/24* (2006.01)
(52) U.S. Cl.
USPC .......................................... 415/214.1

(58) Field of Classification Search
USPC .................. 415/220, 214.1; 411/14.5
See application file for complete search history.

(56) References Cited

U.S. PATENT DOCUMENTS

| | | | | |
|---|---|---|---|---|
| 3,618,994 | A * | 11/1971 | Gepfert et al. | 403/71 |
| 4,338,037 | A * | 7/1982 | Deminski | 403/24 |
| 5,069,587 | A * | 12/1991 | Levenstein | 411/432 |
| 6,199,453 | B1 * | 3/2001 | Steinbock | 81/57.38 |

* cited by examiner

*Primary Examiner* — Ninh H Nguyen
(74) *Attorney, Agent, or Firm* — Ernest G. Cusick; Hoffman Warnick LLC

(57) ABSTRACT

A joint assembly for a steam turbine includes a threaded stud extending through mating openings in a first flange of the first half shell and in a second flange of the second half shell; a first nut threaded onto a first end of the threaded stud adjacent the first flange; a screw coupling the first nut to the first flange; and a dowel extending between and into the first flange and the first nut so as to bear a substantial portion of a torque load applied to the first nut compared to the screw.

20 Claims, 4 Drawing Sheets

STEAM TURBINE HALF SHELL JOINT ASSEMBLY

BACKGROUND OF THE INVENTION

The disclosure relates generally to steam turbine technology, and more particularly, to a turbine half shell joint assembly including a load bearing dowel.

Steam turbines typically include a casing having two half shells that are coupled together to prevent steam leakage. Each half shell includes a flange at each end thereof having openings therein that align with openings in the flange of the other half shell. In order to couple the half shells together, a threaded stud extends through corresponding openings in each half shell and nuts are tightened onto the ends of the stud, clamping the flanges together. During joint assembly, the nut for one end is typically held in place against the lower half shell's flange by one or more screws. During tightening of the nut on the upper part of the stud, however, the screw(s) may shear at the interface of the nut and the flange. Replacement of this type joint assembly is complex and expensive.

BRIEF DESCRIPTION OF THE INVENTION

A first aspect of the disclosure provides a joint assembly for a first and second half shell of a casing of a turbine, the joint assembly comprising: a threaded stud extending through mating openings in a first flange of the first half shell and in a second flange of the second half shell; a first nut threaded onto a first end of the threaded stud adjacent the first flange; a screw coupling the first nut to the first flange; and a dowel extending between and into the first flange and the first nut so as to bear a substantial portion of a torque load applied to the first nut compared to the screw.

A second aspect of the disclosure provides a steam turbine comprising: a plurality of blades coupled to a rotor for turning the rotor under influence of a steam flow; a casing including a first and second half shell coupled together to prevent leakage of the steam flow; an joint assembly coupling the first and second half shells together, the joint assembly comprising: a threaded stud extending through mating openings in a first flange of the first half shell and in a second flange of the second half shell, a first nut threaded onto a first end of the threaded stud adjacent the first flange, a screw coupling the first nut to the first flange, and a dowel extending between and into the first flange and the first nut so as to bear a substantial portion of a torque load applied to the first nut compared to the screw.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
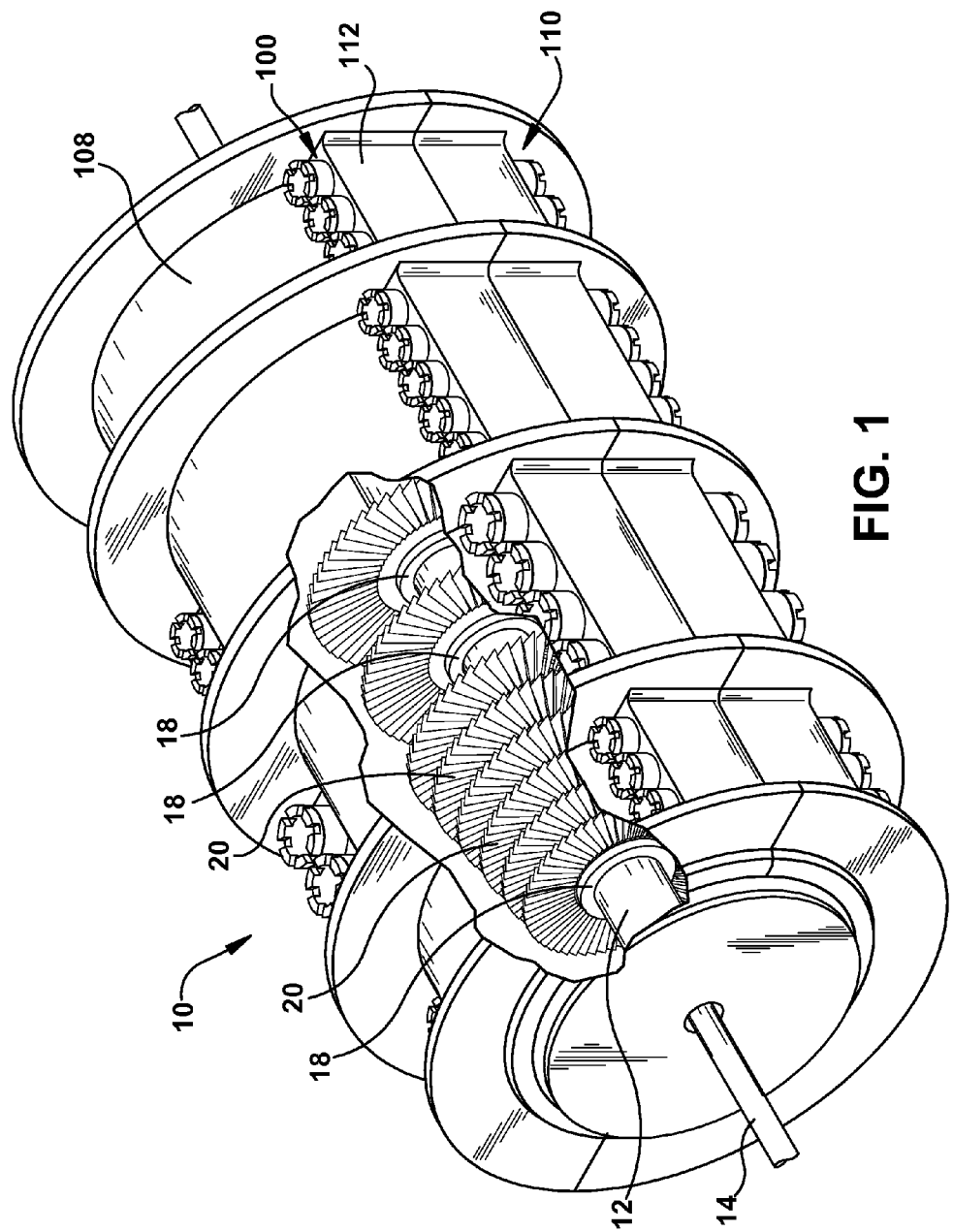
FIG. 1 is a perspective partial cut-away illustration of a high pressure steam turbine.

Referring to the drawings, FIG. 1 shows a perspective partial cut-away illustration of a steam turbine 10. Steam turbine 10 includes a rotor 12 that includes a rotating shaft 14 and a plurality of axially spaced rotor wheels 18. A plurality of rotating blades 20 are mechanically coupled to each rotor wheel 18. More specifically, blades 20 are arranged in rows that extend circumferentially around each rotor wheel 18. A plurality of stationary vanes (not shown) extend circumferentially around shaft 14, and the vanes are axially positioned between adjacent rows of blades 20. The stationary vanes cooperate with blades 20 to form a stage and to define a portion of a steam flow path (not shown) through turbine 10.

In operation, steam enters an inlet of turbine 10 and is channeled through the stationary vanes, which direct the steam downstream against blades 20. The steam passes through the remaining stages imparting a force on blades 20 causing shaft 14 to rotate. At least one end of turbine 10 may extend axially away from rotor 12 and may be attached to a load or machinery (not shown) such as, but not limited to, a generator, and/or another turbine. A casing 108 includes a first half shell 110 and second half shell 112, the latter shown partially removed to expose the inner parts of turbine 10. It is to be understood that the number and configuration of stages may vary from that shown.

Figure 2:
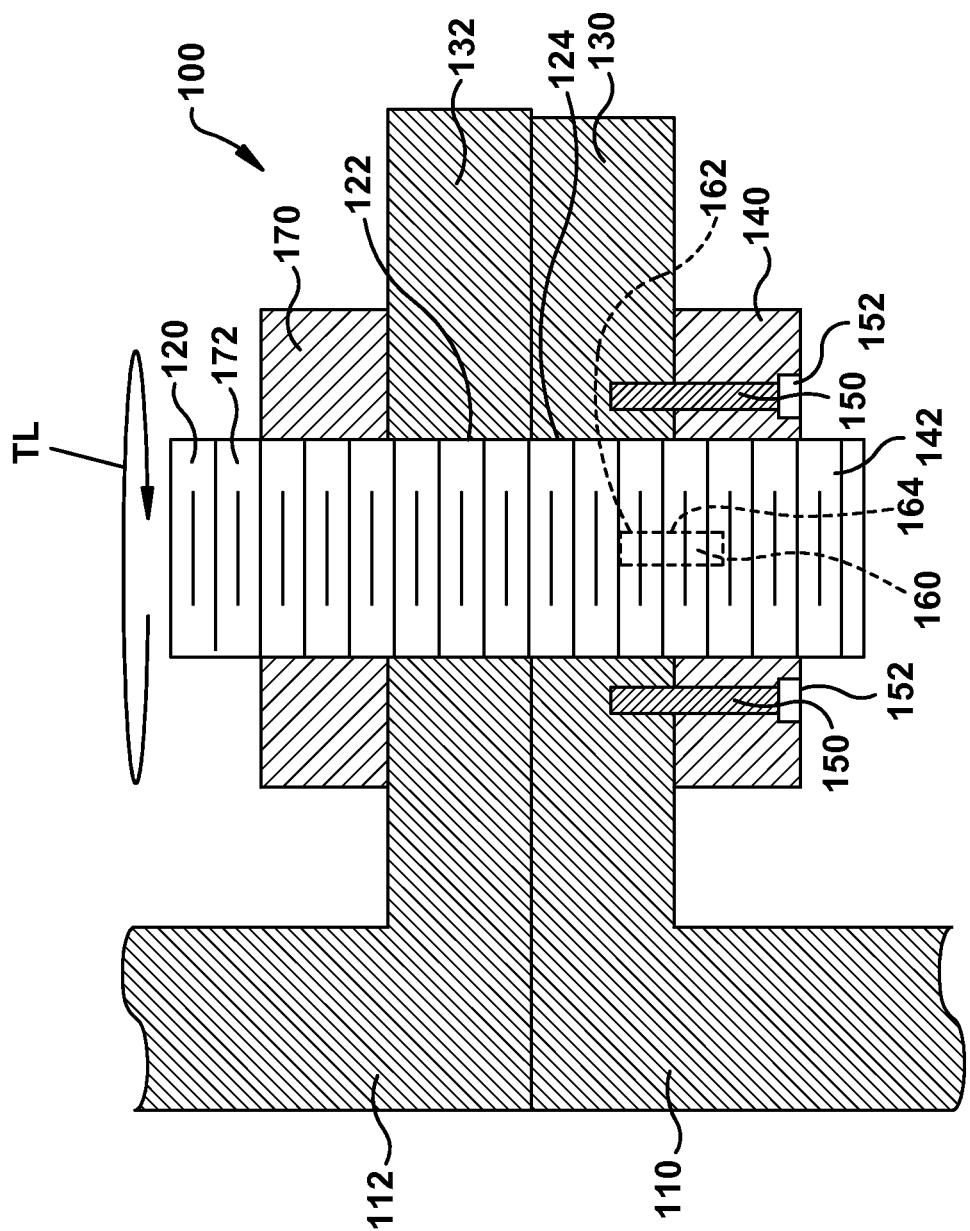
FIG. 2 is a cross-sectional view of a joint assembly according to one embodiment of the invention.

FIG. 2 shows a detailed cross sectional view of a joint assembly 100 for first half shell 110 and second half shell 112 of casing 108 (FIG. 1) of turbine 10 (FIG. 1). Joint assembly 100 may include a threaded stud 120 extending through a mating opening 124 in a first flange 130 of first half shell 110 and a mating opening 122 in a second flange 132 of second half shell 112. Threaded stud 120 may have a length and diameter commensurate with the size of half shells 110, 112, flanges 130, 132 and openings 122, 124. In one embodiment, first and second flanges 130, 132 extend substantially horizontally from first and second half shell 110, 112, respectively. However, flanges 130, 132 do not necessarily have to be provided in this fashion, e.g., if the shell is segmented into more than two parts, requiring coupling at more than two diametrically opposing positions.

Figure 3:
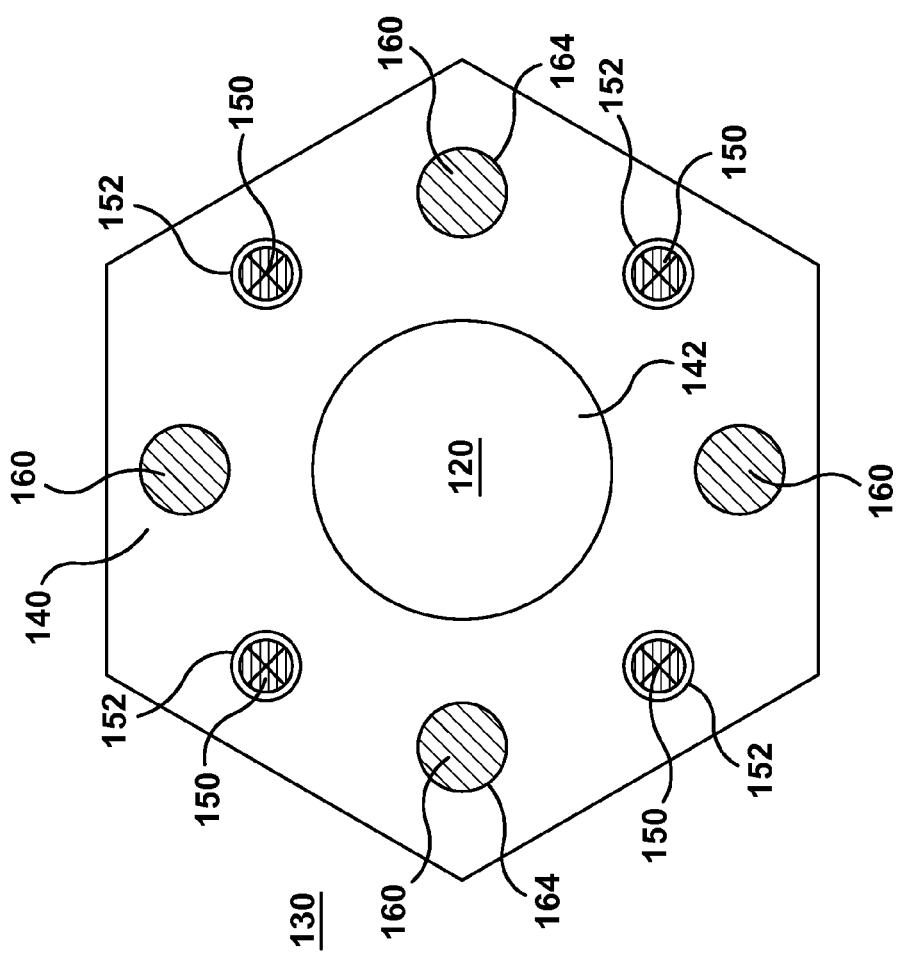
FIG. 3 is a bottom view of a joint assembly according to embodiments of the invention.
Figure 4:
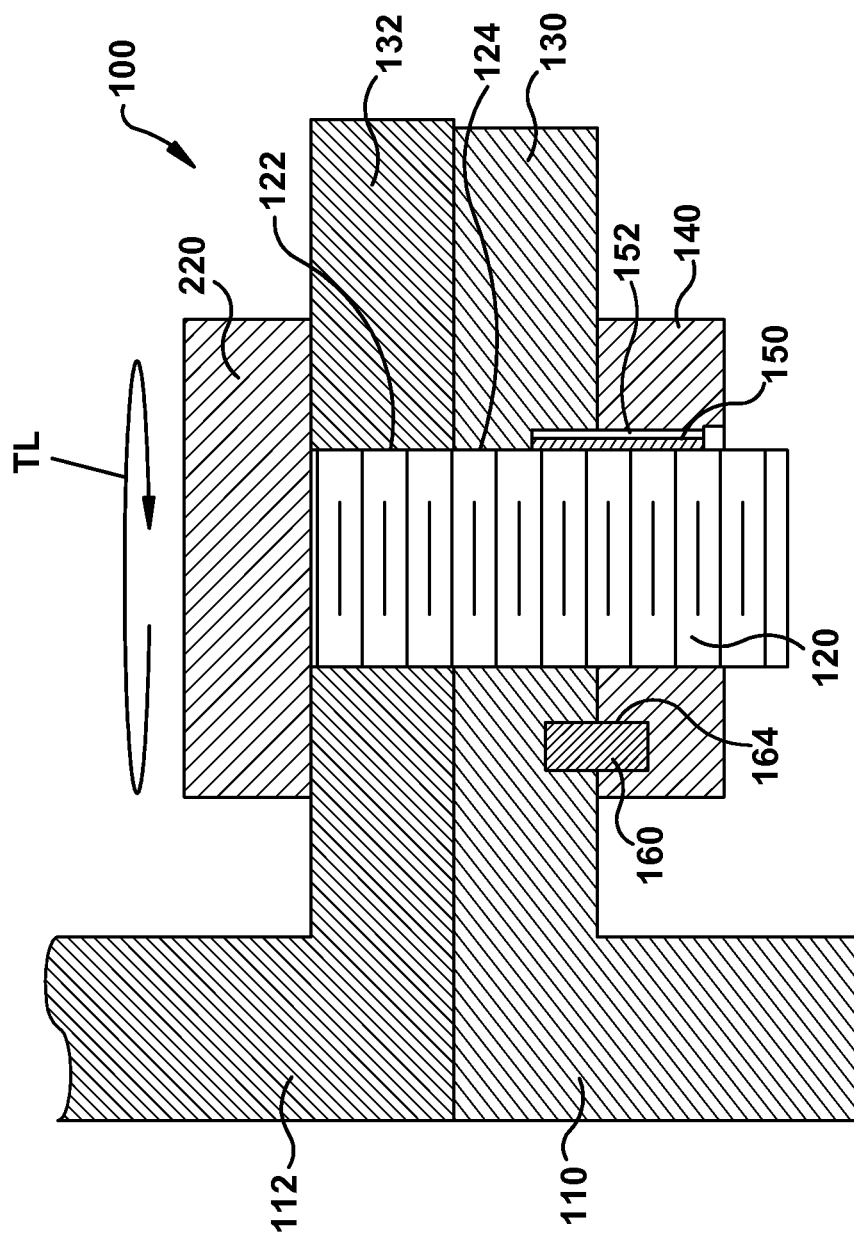
FIG. 4 is a cross-sectional view of a joint assembly according to another embodiment of the invention.

Joint assembly 100 also includes a first nut 140 threaded onto a first end 142 of threaded stud 120 adjacent first flange 130. In order to hold first nut 140 in position during threading of threaded stud 120 with first nut 140, a screw 150 couples first nut 140 to first flange 130. Any number of screws 150 necessary to secure first nut 140 may be used. For example, FIG. 2 shows two screws 150, FIG. 3 shows four screws 150 and FIG. 4 shows one screw 150. Screw(s) 150 extends through a screw opening 152 in first nut 140 and into first flange 130 with a first clearance. The first clearance is shown in an exaggerated manner in FIG. 3 as a gap between screw 150 and opening 152 for illustrative purposes.

In contrast to conventional joint assemblies, a dowel 160 extends between and into first flange 130 and first nut 140 so as to bear a substantial portion of a torque load TL (FIG. 2) applied to first nut 140 compared to screw(s) 150. In particular, dowel 160 is seated in a dowel-flange opening 162 in flange 130 and a dowel-nut opening 164 in first nut 140 with a second clearance that is tighter than the first clearance. The second clearance can be observed in FIG. 3 in how less or no gap is illustrated between dowel(s) 160 and dowel-flange opening(s) 164. During initial assembly, dowel(s) 160 take greater than 95% of the cold torque. Thereafter, threaded stud 120 is heated such that it is free to expand (stretch), during which very minimum or no torque is applied to dowel(s) 160. Any number of dowels 160 required to relieve screw(s) 150 of necessary torque to prevent shearing thereof may be employed. For example, FIG. 2 shows two dowels 160 (on either side of threaded stud 120 into and out of page), FIG. 3 shows four dowels 160 and FIG. 4 shows one dowel 160. In this manner, dowel(s) 160 bears the substantial portion of the torque load applied to first nut 140 compared to screw(s) 150, which prevents shearing of screw(s) 150. Torque load TL may be applied to first nut 140 during threading of threaded stud 120 into first nut 140 and/or, as shown in FIG. 2, during threading and/or tightening of a second nut 170 onto a second end 172 of threaded stud 120 adjacent to second flange 132. In the latter case, torque load TL is applied to second nut 170 and through threaded stud 120 to first nut 140.

Where more than one of each is used, as shown in FIG. 3, screw(s) 150 and/or dowel(s) 160 may be circumferentially spaced about first nut 140. However, this arrangement may not be necessary.

Referring to FIG. 4, in an alternative embodiment, threaded stud 120 includes a bolt head 220 adjacent to second flange 132 in contrast to a second nut 170 (FIG. 2). As in the other embodiments, dowel(s) 160 bears the substantial portion of the torque load TL applied to first nut 140 during threading of threaded stud 120 by turning of bolt head 220, thus preventing shearing of screw(s) 150.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A joint assembly for a first and second half shell of a casing of a turbine, the joint assembly comprising:
   a threaded stud extending through mating openings in a first flange of the first half shell and in a second flange of the second half shell;
   a first nut threaded onto a first end of the threaded stud adjacent the first flange;
   a screw coupling the first nut to the first flange; and
   a dowel extending between and into the first flange and the first nut so as to bear a substantial portion of a torque load applied to the first nut compared to the screw.

2. The joint assembly of claim 1, further comprising a second nut threaded onto a second end of the threaded stud adjacent to the second flange.

3. The joint assembly of claim 1, wherein the screw includes a plurality of screws.

4. The joint assembly of claim 3, wherein the plurality of screws are circumferentially spaced about the first nut.

5. The joint assembly of claim 1, wherein the dowel includes a plurality of dowels.

6. The joint assembly of claim 5, wherein the plurality of dowels are circumferentially spaced about the first nut.

7. The joint assembly of claim 1, wherein the first and second flanges extend substantially horizontally from the first and second half shell, respectively.

8. The joint assembly of claim 1, wherein the screw extends through a screw opening in the first nut and into the first flange with a first clearance, and the dowel is seated in a dowel-flange opening in the flange and a dowel-nut opening in the first nut with a second clearance that is tighter than the first clearance such that the dowel bears the substantial portion of the torque load applied to the first nut compared to the screw.

9. The joint assembly of claim 8, further comprising a second nut threaded onto a second end of the threaded stud adjacent to the second flange, wherein the torque load is applied to the second nut and through the threaded stud to the first nut.

10. The joint assembly of claim 1, wherein the threaded stud includes a bolt head adjacent to the second flange.

11. A steam turbine comprising:
    a plurality of blades coupled to a rotor for turning the rotor under influence of a steam flow;
    a casing including a first and second half shell coupled together to prevent leakage of the steam flow; and
    an joint assembly coupling the first and second half shells together, the joint assembly comprising:
       a threaded stud extending through mating openings in a first flange of the first half shell and in a second flange of the second half shell,
       a first nut threaded onto a first end of the threaded stud adjacent the first flange,
       a screw coupling the first nut to the first flange, and
       a dowel extending between and into the first flange and the first nut so as to bear a substantial portion of a torque load applied to the first nut compared to the screw.

12. The steam turbine of claim 11, further comprising a second nut threaded onto a second end of the threaded stud adjacent to the second flange.

13. The steam turbine of claim 11, wherein the screw includes a plurality of screws.

14. The steam turbine of claim 13, wherein the plurality of screws are circumferentially spaced about the first nut.

15. The steam turbine of claim 11, wherein the dowel includes a plurality of dowels.

16. The steam turbine of claim 15, wherein the plurality of dowels are circumferentially spaced about the first nut.

17. The steam turbine of claim 11, wherein the first and second flanges extend substantially horizontally from the first and second half shell, respectively.

18. The steam turbine of claim 11, wherein the screw extends through a screw opening in the first nut and into the first flange with a first clearance, and the dowel is seated in a dowel-flange opening in the flange and a dowel-nut opening in the first nut with a second clearance that is tighter than the first clearance such that the dowel bears the substantial portion of the torque load applied to the first nut compared to the screw.

19. The steam turbine of claim 11, further comprising a second nut threaded onto a second end of the threaded stud adjacent to the second flange, wherein the torque load is applied to the second nut and through the threaded stud to the first nut.

20. The steam turbine of claim 11, wherein the threaded stud includes a bolt head adjacent to the second flange.

* * * * *